United States Patent [19]

Olson et al.

[11] 4,132,244

[45] Jan. 2, 1979

[54] DRIVE MEANS FOR IRRIGATION SYSTEM

[75] Inventors: Lloyd C. Olson, Beaverton; Gail Cornelius, Portland, both of Oreg.

[73] Assignee: R. M. Wade & Co., Portland, Oreg.

[21] Appl. No.: 809,572

[22] Filed: Jun. 23, 1977

Related U.S. Application Data

[63] Continuation of Ser. No. 663,259, Mar. 3, 1976, abandoned.

[51] Int. Cl.$^2$ .............................................. B05B 3/18
[52] U.S. Cl. .................................. 137/344; 239/192; 239/213
[58] Field of Search ................ 137/344; 239/177, 192, 239/212, 213

[56] References Cited

U.S. PATENT DOCUMENTS

| Re. 28,727 | 3/1976 | Reinke | 137/344 X |
|---|---|---|---|
| 959,914 | 5/1910 | Bevill | 239/212 X |
| 3,355,109 | 11/1967 | Kane | 137/344 X |
| 3,361,360 | 1/1968 | Purtell | 239/213 X |
| 3,498,542 | 3/1970 | Hefner et al. | 239/212 |
| 3,512,548 | 5/1970 | Miller | 239/213 X |
| 3,583,639 | 6/1971 | Cornelius | 137/344 X |

Primary Examiner—Alan Cohan
Assistant Examiner—Gerald A. Michalsky
Attorney, Agent, or Firm—Phillips, Moore, Weissenberger, Lempio & Majestic

[57] ABSTRACT

An irrigation system includes an irrigation line mounted on wheels which may be turned from positions perpendicular to the line, where they serve to move the irrigation line across a field in a direction perpendicular to its length, to positions parallel to the line, wherein the line may be towed lengthwise to another location. Movement of such wheels provides for appropriate engagement and disengagement of gear means through which drive is provided to the wheels.

20 Claims, 6 Drawing Figures

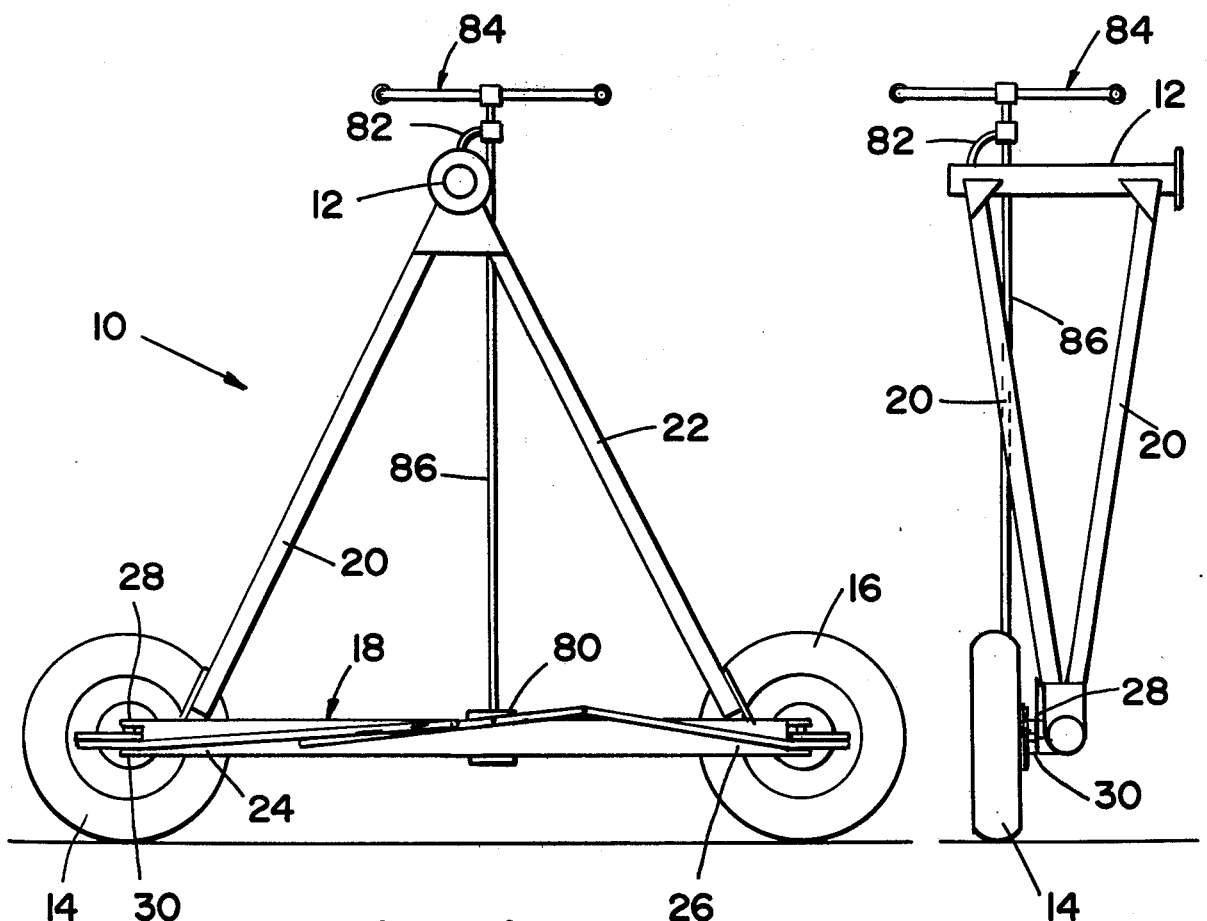
FIG_1
FIG_2

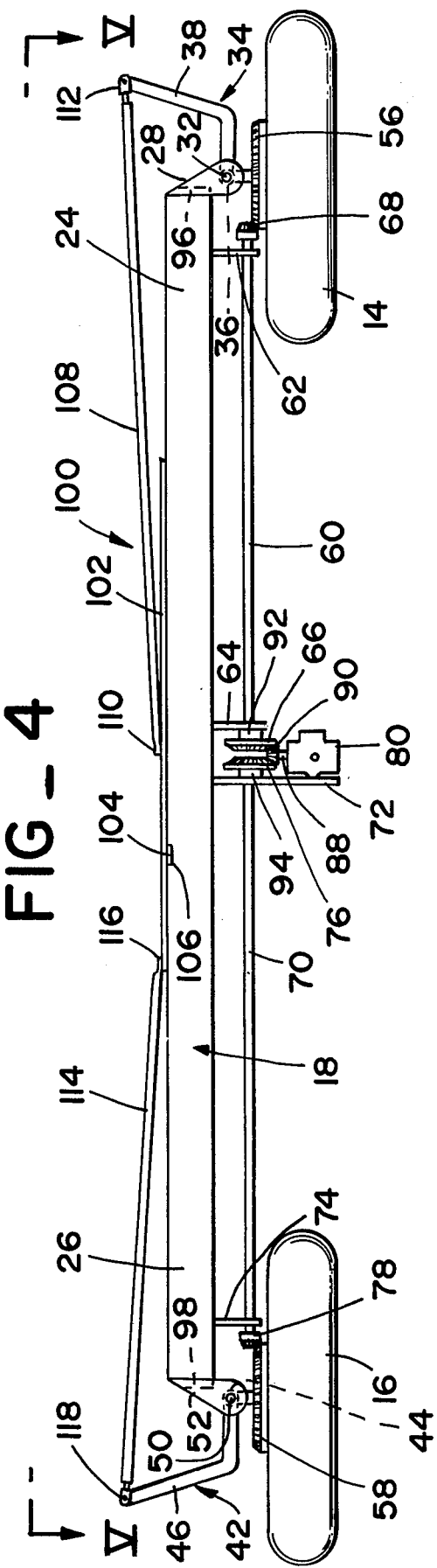
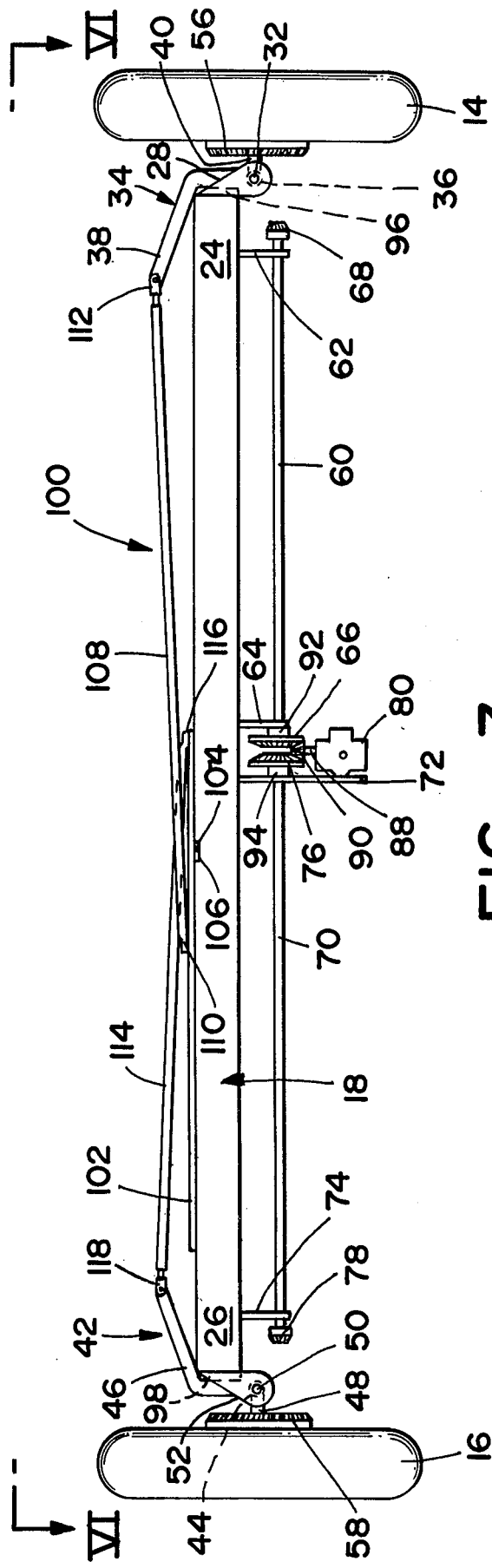

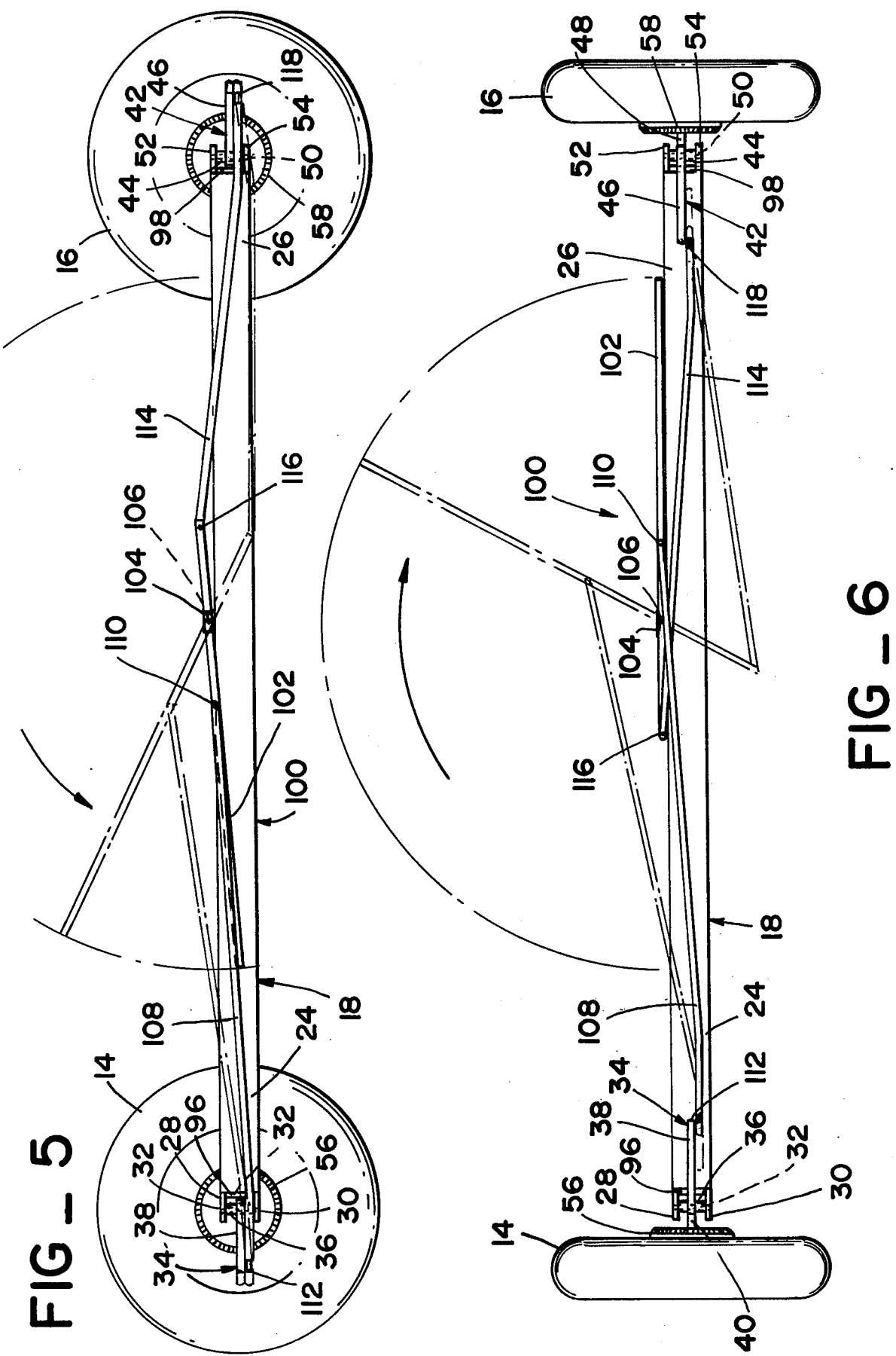

DRIVE MEANS FOR IRRIGATION SYSTEM

This is a continuation, of Ser. No. 663,259, filed Mar. 3, 1976, now abandoned.

BACKGROUND OF THE INVENTION

This invention relates to irrigation systems, and more particularly, to an irrigation system including an irrigiation line supported by wheels which may be turned perpendicular to the line, and parallel thereto as selected.

In the use of a wheel-supported irrigation line, with the wheels being normally positioned perpendicular to the line to drive the line in a direction perpendicular to its length, it is often found desirable to provide that the wheels may be selectively turned so as to be parallel to the length of the line. With the wheels so positioned, the line may then be towed from one location to another, i.e., towed endwise, so as to be movable in a relatively convenient manner. U.S. Pat. No. 3,583,639 (assigned to the assignee of this invention) discloses a system wherein the wheels can indeed be so selectively positioned. While such a system has proved highly effective in operation, it will be seen that in the disconnecting of the drive from the wheels, a gear is slidably moved along a shaft by a linkage and fork structure. It will be understood that it is always desirable to increase efficiency of operation of an apparatus, meanwhile maintaining high efficiency of use.

U.S. Pat. Nos. 3,623,662 and 3,512,548 also disclose systems generally similar to the above-described type, wherein the wheels thereof may be pivoted from one position to another. However, it will be seen that in each patent each wheel must be pivoted by a relatively complicated arrangement independent of the pivoting of any other wheel.

SUMMARY OF THE INVENTION

It is accordingly an object of this invention to provide an irrigation system supported by wheels, wherein the wheels may be easily and conveniently moved from respective positions perpendicular to the irrigation line, to respective positions parallel to the irrigation line to allow for towing of the irrigation line as desired.

It is a further object of this invention to provide apparatus which, while fulfilling the above object, is extremely simple in design and convenient in use.

Broadly stated, the invention is in an irrigation system in which an irrigation line is moved across an areato be irrigated. In such irrigation system, a plurality of tower assemblies are spaced along and support the irrigation line, with each tower assembly comprising a beam positioned generally perpendicular to the irrigation line. Further included are means interconnecting the beam and the irrigation line, a first wheel pivotably mounted relative to the beam adjacent one end thereof, a second wheel pivotably mounted relative to the beam adjacent the other end thereof, the first and second wheels being pivotable to respective first positions generally perpendicular to the irrigation line to enable the irrigation line to be moved in a direction perpendicular to its length, and pivotable to respective second positions generally parallel to the line. Further included are drive shaft means rotatably mounted relative to the beam and held from movement relative to the beam along the longitudinal axis of the drive shaft means. Motor means are included for rotating the drive shaft means. A first gear is secured in position relative to the first wheel and rotatable therewith. Actuator means are included, comprising an actuating member operatively coupled with the first wheel for providing that movement of the actuating member in one direction pivots the first wheel to the first position thereof with the pivoting of the first wheel bringing the second gear into engagement with the first gear so that power can be applied from the motor means through the drive shaft means, the first gear, the second gear, to the first wheel. Movement of the actuating member in another direction pivots the first wheel to the second position, with the pivoting of the first wheel disengaging the second gear from the first gear.

BRIEF DESCRIPTION OF THE DRAWINGS

These and other objects of the invention will become apparent from a study of the following specification and drawings, in which:

FIG. 1 is a side elevation of a tower supporting an irrigation line, and incorporating the invention;

FIG. 2 is an end elevation of the tower of FIG. 1;

FIG. 3 is a plan view of a portion of the tower of FIGS. 1 and 2, showing the wheels in one position relative to the tower;

FIG. 4 is a view similar to that shown in FIG. 3, but with the wheels shown in another position relative to the tower;

FIG. 5 is a view taken along the line V—V of FIG. 4; and

FIG. 6 is a view taken along the line VI—VI of FIG. 3.

DESCRIPTION OF THE PREFERRED EMBODIMENT

Shown in FIGS. 1 and 2 is a tower assembly 10, which is one of a plurality thereof spaced along and supporting an irrigation line 12. Each tower assembly 10 includes wheels 14, 16 which allow the irrigation line 12 to be moved across an area to be irrigated, as is well known. The tower assembly 10 includes a generally horizontal beam 18 disposed perpendicular to the irrigation line 12, and members 20, 22 extending upwardly and inwardly of the ends 24, 26 of the beam 18 to support such irrigation line 12. The end 24 of the beam has flanges 28, 30 (see also FIGS. 3-6). A bracket 34 is associated with the end 24 of the beam 18, and includes a tubular portion 36 disposed about the pin 32 between the flanges 28, 30, so as to be pivotable about the longitudinal axis of the pin 32, and an angled arm 38 fixed to the tubular portion 36 and extending therefrom. The bracket 34 also includes an axle 40 fixed to and extending from the tubular portion 36, and the wheel 14 is rotatably mounted to the axle 40 so as to be rotatable about the longitudinal axis thereof.

It will be seen that the bracket 34 is pivotably secured relative to the beam 18 adjacent the end 24 thereof. A similar bracket 42, made up of a tubular portion 44, an angled arm 46 fixed thereto, and an axle 48 fixed to the tubular portion 44, with the tubular portion 44 disposed about a pin 50 interconnecting a pair of flanges 52,54, is associated with the other end 26 of the beam 18. The wheel 16 is rotatably mounted to the axle 48 so as to be rotatable about the longitudinal axis thereof.

A bevel gear 56 is secured in position relative to the wheel 14 to be rotatable therewith, and likewise a bevel gear 58 is secured in position relative to the wheel 16 to be rotatable therewith. The bevel gears 56,58 have outwardly extending teeth as shown.

A drive shaft 60 is rotatably mounted relative to the beam 18 by means of flanges 62,64 extending from the beam 18 defining apertures through which the drive shaft 60 is disposed. The drive shaft 60 has fixed adjacent its inner end a bevel gear 66, and adjacent its outer end, i.e., adjacent the wheel 14, a bevel gear 68. The bevel gears 66,68 are of course rotatable with the shaft 60. Another drive shaft 70 is rotatably mounted relative to the beam 18 by means of flanges 72, 74. The inner end of such drive shaft 70 has fixed thereto a bevel gear 76 positioned adjacent the bevel gear 68, and the end of the drive shaft 70 adjacent the wheel 16 has fixed thereto a bevel gear 78. The bevel gears 76,78 are rotatable with the shaft 70. Again, it is to be noted that the bevel gears 68, 78 have outwardly extending teeth as shown.

The flange 72 extends beyond the bevel gears 66,76, and has fixed thereto a water motor 80. During operation of the system, hose 82 directs water under pressure to a rotatable-two-armed sprinkler 84 where it is ejected through orifices in the opposite outer ends of the two arms. This imparts rotation to the sprinkler 84 and the shaft 86 upon which such sprinkler 84 is supported, the shaft 86 being connected with the motor 80 to in turn drive the motor 80. The output shaft 88 of the motor 80 has fixed thereto a single bevel gear 90 in engagement with the pair of bevel gears 76,66. Contact of the bevel gears 76,66 with the bevel gear 90 keep the shafts 60,70 from moving toward the motor 80 and shafts 60,70 are provided with respective collars 92,94 respectively fixed thereto inward of the flanges 64,72. The drive shafts 60,70 are thereby held from movement relative to the beam 18 along the respective longitudinal axes thereof.

The axes of rotation of the gears 56,68,58,78 and the axes of rotation of the shafts 60,70 lie in the same horizontal plane.

The bevel gears 90,66,76 act as power transmission means through which power may be applied to drive the sahfts 60,70 in opposite rotational directions. Such power transmission means, it will be seen, are mounted substantially midway between the ends of the beam 18.

The brackets 34,42 allow the wheels 14,16 to be pivoted to the positions shown in FIG. 4 wherein the bevel gear 56 is in engagement with the bevel gear 68 and the bevel gear 58 is in engagement with the bevel gear 78. The wheels 14,16 are therefore positioned generally perpendicular to the irrigation line 12, so that power may be applied by the water motor 80 through the bevel gears 66,76, through the drive shafts 60,70, through the bevel gears 68, 78, 56, 58, and to the wheels 14, 16. It will also be seen that the wheels 14, 16 may be pivoted to the positions shown in FIG. 3, wherein the arms 38, 46 contact respective block members 96, 98 fixed to the ends 24, 26 of the beam 18 between the flanges 28, 30 and 52, 54. Thereby, the wheels 14, 16 are positioned parallel to the irrigation line 12 to enable the irrigation line 12 to be moved along its length. With the wheels 14, 16 as positioned in FIG. 3, the gear 56 is disengaged from the gear 68, and the gear 58 is disengaged from the gear 78, so that power can no longer be applied to the wheels 14, 16. Conversely, pivoting of the wheels 14, 16 back to the positions shown in FIG. 4 brings the gear 56 into engagement with the gear 68 and the gear 58 into engagement with the gear 78 so that power can be applied from the motor 80 through the drive shafts 60, 70, the gears 66, 76, the gears 68, 56, 78, 58, and to the wheels 12, 14.

Actuator means 100, including the brackets 34, 42, are shown in detail in FIGS. 3-6, for so selectively positioning the wheels 14, 16. Such actuator means 100 include an actuating member 102 pivotally mounted relative to the beam 18 by means of a first pivot 104 interconnecting the actuating member 102 and a bracket 106 fixed to the beam 78. The first pivot 104 is chosen to be positioned between the ends of the actuating member 102. Further included is a link member 108, and a second pivot 110 securing one end of the link member 108 to the actuating member 012 on one side of the first pivot 104. A third pivot 112 secures the other end of the link member 108 to the extending end of the arm 38 of the bracket 34. Further included is a link member 114, and a fourth pivot 116 securing one end of the link member 114 to the actuating member 102 on the other side of the first pivot 104. A fifth pivot 118 secures the other end of the link member 114 to the extending end of the arm 46 of the bracket 42.

As described above, with the parts in position as shown in FIG. 4, power may be applied to the wheels 14, 16 so that the irrigation line 12 is moved in a direction generally perpendicular to its length across an area to be irrigated. In such case, the actuating member 102 has been moved to its full extent in one direction (see FIG. 5) to pivot the arms 38, 46 outwardly to bring the gears 56, 58 into engagement with the gears 68, 70 respectively. In order to pivot the wheels 14, 16 to the positions shown in FIG. 3, the actuating member 102 is moved in the direction shown in FIG. 6, to move the arms 38, 46 relatively toward each other. It should be noted that the particular configuration of the linkage and brackets is chosen so that the contact between the arm 38 and pad 96 takes place as the fourth pivot 116 approaches a straight line connecting the first pivot 104 and the third pivot 112. Thereupon, further movement of the actuating member 102 in such direction moves the fourth pivot 116 past such straight line connecting the first pivot 104 and third pivot 112 to determine an over-center or stable condition of the wheels 14, 16 in such positions as shown in FIG. 6.

Likewise, when the actuating member 102 is moved back in the one direction as shown in FIG. 5, the configurations and placings of the parts are chosen such that full engagement of the gear 56 and gear 68 takes place as the second pivot 110 approaches a straight line connecting the first pivot 104 and third pivot 112, so that further movement of the actuating member 112 in such direction as shown in FIG. 5 moves the second pivot 110 past a straight line connecting the first pivot 104 and third pivot 122, to determine an over-center or stable condition of the wheels 14,16 with the gears 56,68 in full engagement.

Through such apparatus, it is thereby insured that stable placing of the wheels 14,16 in the chosen positions takes place, whether the wheels 14,16 are positioned perpendicular to the irrigation line 12, or parallel thereto. It will be noted that, in accordance with the above discussion, the actual pivoting of the wheels 14,16 disengages the gears 56,68 and gears 58,78, respectively, and the actual pivoting the wheels 14,16 likewise brings the gear 56 into engagement with the gear 68 and the gear 58 into engagement with the gear 78. It is to be noted that providing the gears 56,58,68,78 of bevel configuration with outward teeth provides for an uncomplicated and efficient engaging and disengaging of such gears. Thus, an extremely simple apparatus for providng appropriate positioning of the wheels 14,16 is disclosed, such apparatus also being extremely convenient in operation, and not requiring the disassembly of any parts, or any relatively complicated structure wherein, for example, the sliding of a gear along a shaft takes place. And, it should be noted that the proper positioning of the wheels 14,16 results from the movement of a single member 102 in one and the other directions, i.e., each wheel on a tower assembly 10 need not be positioned separately, but rather such positioning of both wheels 14,16 of a tower assembly 10 takes place upon the movement of the single actuating member 102 associated with such tower assembly 10.

What is claimed is:

1. In an irrigation system in which an irrigation line is moved across an area to be irrigated, a plurality of tower assemblies spaced along and supporting the irrigation line, each tower assembly comprising a beam positioned generally perpendicular to the irrigation line means interconnecting the beam and irrigation line, a first wheel pivotably mounted relative to the beam adjacent one end thereof, a second wheel pivotably mounted relative to the beam adjacent the other end thereof, the first and second wheels being pivotable to respective first positions generally perpendicular to the irrigation line to enable said irrigation line to be moved in a direction perpendicular to its length, and pivotable to respective second positions generally parallel to said line, first drive shaft means rotatably mounted along said beam and held for movement relative to said beam along the longitudinal axis of said first drive shaft means, motor means for rotating said first drive shaft means, a first gear secured in position to the first drive shaft means and rotatable therewith, a second gear rigidly secured in position relative to the first wheel so as to be non-movable in any direction relative thereto, the second gear being rotatable with the first wheel, second drive shaft means rotatably mounted along said beam and held for movement relative to said beam along the longitudinal axis of the second drive shaft means, the motor means for rotating said second drive shaft means, a third gear secured in position to the second drive shaft means and rotatable therewith, a fourth gear rigidly secured in position relative to the second wheel so as to be non-movable in any direction relative thereto, the fourth gear being rotatable with the second wheel, and actuator means, comprising an actuating member and means operatively coupling said actuating member and first and second wheels, for providing that movement of the actuating member in one direction pivots the first and second wheels to the first positions thereof with the pivoting of the first and second wheels bringing the second and fourth gears into engagement with the first and third gears respectively so that power can be applied from the motor means through the first drive shaft means, the first gear, the second gear, to the first wheel, and so that power can be applied from the motor means through the second drive shaft means, the third gear, the fourth gear, to the second wheel, and movement of the actuating member in another direction pivots the first and second wheels to the second positions thereof, with such pivoting of the first and second wheels disengaging the second gear from the first gear, and the fourth gear from the third gear.

2. The apparatus of claim 1 wherein the first, second, third and fourth gears are bevel gears.

3. The apparatus of claim 2 wherein the first, second, third and fourth bevel gears define outwardly extending teeth.

4. The apparatus of claim 1 wherein the axes of rotation of the first, second, third and fourth gears lie in a horizontal plane.

5. The apparatus of claim 4 wherein the axes of rotation of the first and second shaft means lie in the same horizontal plane as the axes of rotation of the first, second, third and fourth gears.

6. In an irrigation system in which an irrigation line is moved across an area to be irrigated, a plurality of tower assemblies spaced along and supporting the irrigation line, each tower assembly comprising a beam generally perpendicular to the irrigation line, means interconnecting the beam and irrigation line, a wheel pivotably mounted relative to the beam adjacent one end thereof, said wheel being pivotable to a first position generally perpendicular to the irrigation line, and pivotable to a second position generally parallel to said line, drive shaft means rotatably mounted relative to said beam and held for movement relative to said beam along the longitudinal axis of the drive shaft means, a first gear secured in position to the drive shaft means and rotatable therewith, a second gear rigidly secured in position relative to the wheel so as to be non-movable in any direction relative thereto, the second gear being rotatable with the wheel, the wheel being pivotable to the first position thereof with said pivoting of said wheel bringing the second gear into engagement with the first gear, with the respective axes of rotation of the first and second gears being generally perpendicular, the wheel being pivotable to the second position thereof with the pivoting of the wheel disengaging the second gear from the first gear.

7. The apparatus of claim 6 wherein the first and second gears are first and second bevel gears defining outwardly extending teeth.

8. The apparatus of claim 6 wherein the respective axes of rotation of the wheel and drive shaft means are generally parallel with the wheel in the second position thereof.

9. The apparatus of claim 6 wherein the wheel mounted relative to the beam adjacent one end thereof is a first wheel, the apparatus having a second wheel mounted relative to the beam adjacent to the other end thereof, wherein the drive shaft means includes first and second drive shaft means, the first drive shaft means rotatably mounted relative to said beam and held for movement relative to said beam along the longitudinal axis of the first drive shaft means, power transmission means mounted relative to the beam and through which power may be applied to rotate the first drive shaft means, the first gear secured in position relative to the first drive shaft means and rotatable therewith, and the second drive shaft means rotatably mounted relative to said beam and held for movement relative to said beam along the longitudinal axis of the second drive shaft means, the power transmission means being provided so that power may be applied therethrough to the second drive shaft means to rotate said second drive shaft means, a third gear secured in position to the second drive shaft means and rotatable therewith, a fourth gear secured in position relative to the second wheel and rotatable therewith, and wherein the first and second drive shaft means rotate in opposite directions upon power being applied through the transmission means thereto.

10. The apparatus of claim 9 wherein the power transmission means are mounted relative to the beam substantially midway between the ends thereof.

11. The apparatus of claim 9 wherein the power transmission means comprise a single bevel gear to which power may be applied, and a pair of bevel gears in engagement with the single bevel gear and through which the first and second drive shaft means may be rotated.

12. The apparatus of claim 9 wherein the first and second drive shafts are mounted along the beam.

13. The apparatus of claim 9 wherein the second wheel is pivotably mounted to the beam, which second wheel is selectively pivotable to a first position generally perpendicular to the irrigation line, and pivotable to a second position generally parallel to said irrigation line, the third and fourth gears being in engagement, with the second wheel in the first position.

14. The apparatus of claim 13 wherein with the wheels in the first position the axes of rotation of the first and second gears are perpendicular, and the axes of rotation of the third and fourth gears are perpendicular.

15. The apparatus of claim 9 wherein the first, second, third, and fourth gears are bevel gears.

16. In an irrigation system in which an irrigation line is moved across an area to be irrigated, a plurality of tower assemblies spaced along and supporting the irrigation line, each tower assembly comprising a beam generally perpendicular to the irrigation line, means interconnecting the beam and irrigation line, a wheel mounted relative to the beam adjacent one end thereof, drive shaft means rotatably mounted along said beam and held for movement relative to said beam along the longitudinal axis of the drive shaft means, a first gear secured in position to the drive shaft means and rotatable therewith, a second gear rigidly secured in position relative to the wheel so as to be non-movable in any direction relative thereto, the second gear being rotatable with the wheel, the second gear being in engagement with the first gear with the axis of rotation of said wheel generally parallel to the irrigation line, with the respective axes of rotation of the first and second gears lying in the same horizontal plane.

17. The apparatus of claim 16 wherein the rotational axis of the drive shaft means lies in the same horizontal plane as the rotational axes of the first and second gears.

18. The apparatus of claim 17 wherein the respective axes of rotation of the first and second gears are generally perpendicular.

19. In an irrigation system in which an irrigation line is moved across an area to be irrigated, a plurality of tower assemblies spaced along and supporting the irrigation line, each tower assembly comprising a beam positioned generally perpendicular to the irrigation line, means interconnecting the beam and irrigation line, a first wheel pivotably mounted relative to the beam adjacent one end thereof, a second wheel pivotably mounted relative to the beam adjacent the other end thereof, the first and second wheels being pivotable to respective first positions generally perpendicular to the irrigation line to enable said irrigation line to be moved in a direction perpendicular to its length, and pivotable to respective second positions generally parallel to said line, drive shaft means rotatably mounted relative to said beam and held for movement relative to said beam along the longitudinal axis of the drive shaft means, motor means for rotating said drive shaft means, a first gear secured in position to the drive shaft means and rotatable therewith, a second gear secured in position relative to the first wheel and rotatable therewith, and actuator means comprising an actuating member operatively coupled with said first wheel for providing that movement of the actuating member in one direction pivots the first wheel to the first position thereof with said pivoting of the first wheel bringing the second gear into engagement with the first gear so that power can be applied from the motor means through the drive shaft means, the first gear, the second gear, to the first wheel, and movement of the actuating member in another direction pivots the first wheel to the second position thereof, with the pivoting of the first wheel disengaging the second gear from the first gear, wherein said actuating member is operatively coupled with said second wheel for providing that movement of the actuating member in said one direction pivots the second wheel to the first position thereof, and movement of the actuating member in said another direction pivots the second wheel to the second position thereof, wherein the actuator means further comprise said actuating member, and a first pivot securing the actuating member relative to the beam, said first pivot being between the ends of the actuating member, the actuator means further comprising a first bracket pivotally secured relative to the beam adjacent one end thereof and to which the first wheel is rotatably mounted, a fist link member, a second pivot securing one end of the first link member to the actuating member on one side of the first pivot, and a third pivot securing the other end of the first link member to the first bracket, a second bracket pivotally secured relative to the beam adjacent the other end thereof, and to which the second wheel is rotatably mounted, a second link member, a fourth pivot securing one end of the second link member to the actuating member on the other side of the first pivot and a fifth pivot securing the other end of the second link member to the second bracket.

20. The apparatus of claim 19 wherein the full engagement of the first and second gears determines the first position of the first wheel, and wherein as the second pivot approaches a line connecting the first pivot and third pivot upon movement of the actuating member in one direction the first and second gears are fully engaged so that further movement of the actuating member in one direction moves the second pivot past a line connecting the first pivot and third pivot, to determine a stable condition of the first wheel with the first and second gears in full engagement.

* * * * *